United States Patent [19]

Melbert

[11] Patent Number: 5,594,335
[45] Date of Patent: Jan. 14, 1997

[54] POSITION-DETECTING APPARATUS WITH HALL ELEMENTS AND AN INTERPOLATION CIRCUIT FOR INTERPOLATING ANALOG OUTPUT SIGNALS OF THE HALL ELEMENTS

[75] Inventor: Joachim Melbert, Deisenhofen, Germany

[73] Assignee: Siemens Aktiengesellschaft, Munich, Germany

[21] Appl. No.: 401,475

[22] Filed: Mar. 9, 1995

Related U.S. Application Data

[63] Continuation of PCT/DE93/00740, Aug. 17, 1993.

[30] Foreign Application Priority Data

Sep. 9, 1992 [DE] Germany ............... 9212159 U

[51] Int. Cl.⁶ .............. G01D 5/14; G01B 7/14; G01B 7/30; H03F 3/45
[52] U.S. Cl. ............... 324/207.2; 324/207.12; 324/207.24; 324/207.25; 324/251; 330/260; 327/54
[58] Field of Search .......... 324/173, 174, 324/207.12, 207.2, 207.21, 207.22, 207.23, 207.24, 207.25, 207.26, 251, 252; 327/52–55, 510, 511; 330/260

[56] References Cited

U.S. PATENT DOCUMENTS

| | | | |
|---|---|---|---|
| 3,205,485 | 9/1965 | Noltingk | 324/207.24 X |
| 3,226,631 | 12/1965 | Kuhrt et al. | 324/207.2 X |
| 3,286,161 | 11/1966 | Jones et al. | 324/207.2 X |
| 3,297,940 | 1/1967 | Mulligan et al. | 324/173 X |
| 3,961,243 | 6/1976 | Schulz | 324/207.19 |
| 4,518,918 | 5/1985 | Avery . | |
| 4,859,941 | 8/1989 | Higgs et al. | 324/251 X |
| 4,893,502 | 1/1990 | Kubota et al. . | |
| 5,084,674 | 1/1992 | Lachmann et al. | 324/251 X |

FOREIGN PATENT DOCUMENTS

| | | |
|---|---|---|
| 0115391 | 8/1984 | European Pat. Off. . |
| 0203275 | 12/1986 | European Pat. Off. . |
| 0427882 | 5/1991 | European Pat. Off. . |
| 3826408 | 2/1989 | Germany . |
| 2093295 | 8/1982 | United Kingdom ........ 324/207.2 |
| 9210723 | 6/1992 | WIPO . |

OTHER PUBLICATIONS

Siemens Components, vol. 25, No. 6, Dec. 1990, p. 252, "Hall ICs for Speed and Position Detection in Automobiles".

Primary Examiner—Gerard R. Strecker
Attorney, Agent, or Firm—Herbert L. Lerner; Laurence A. Greenberg

[57] ABSTRACT

An apparatus for detecting a geometric relation includes a device having a magnetic field source and a configuration being formed of a multiplicity of Hall elements. A magnetic induction is dependent on the relative geometric configuration between the Hall element configuration and an object having a geometric position which is to be detected. The Hall elements are disposed at a given distance from one another along a given line. An interpolation circuit interpolates the analog output signals of at least two Hall elements.

6 Claims, 5 Drawing Sheets

FIG 3a
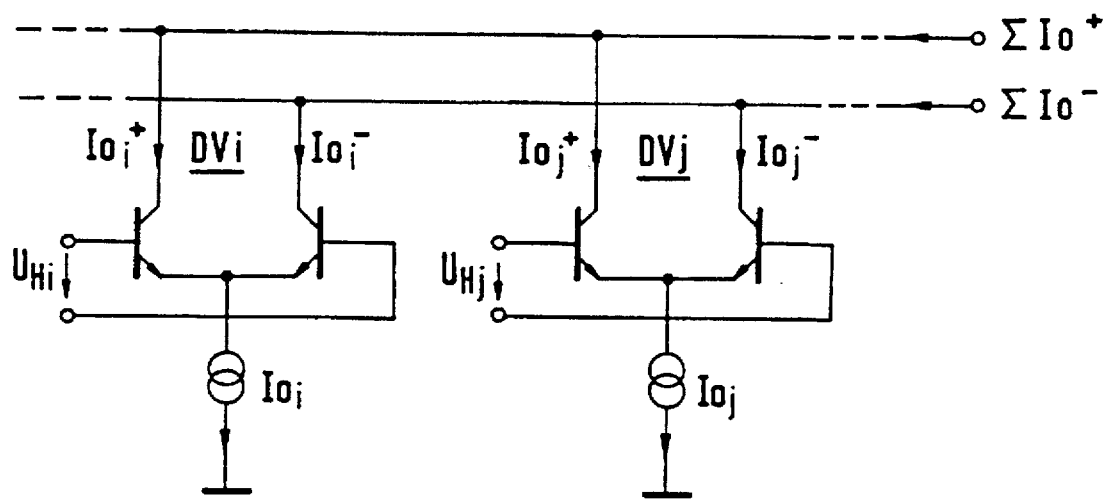
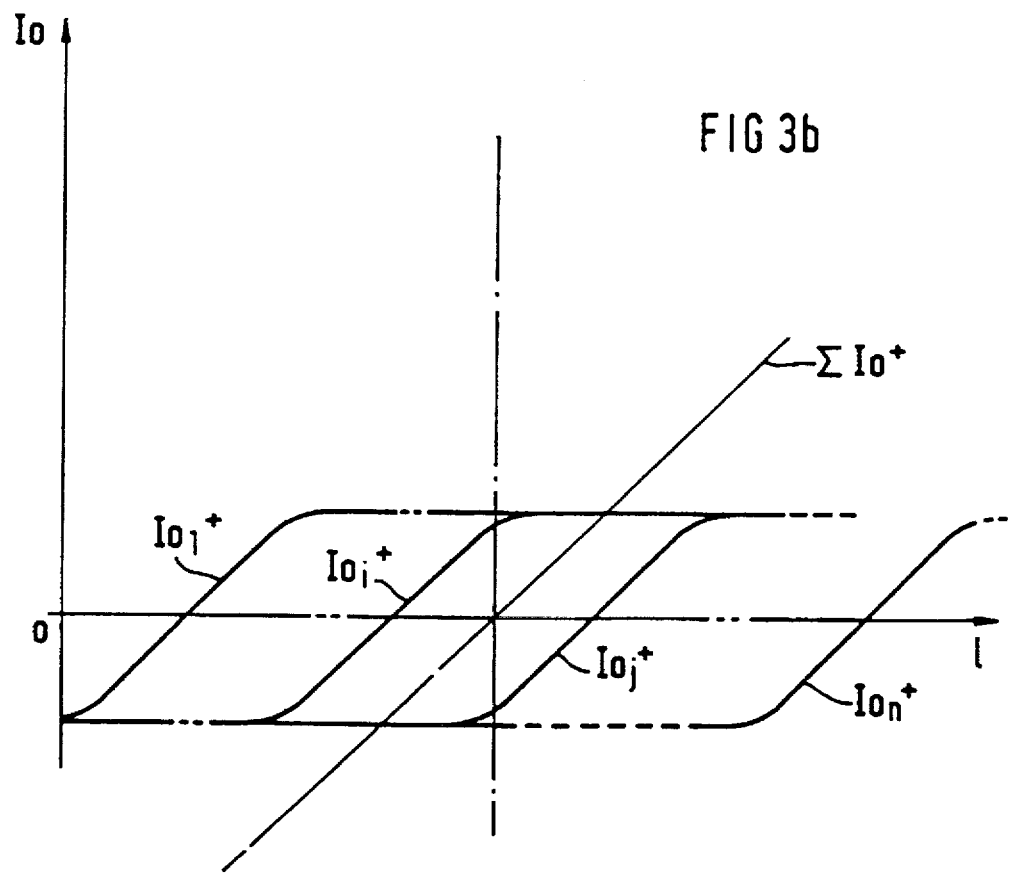
FIG 3b

POSITION-DETECTING APPARATUS WITH HALL ELEMENTS AND AN INTERPOLATION CIRCUIT FOR INTERPOLATING ANALOG OUTPUT SIGNALS OF THE HALL ELEMENTS

CROSS-REFERENCE TO RELATED APPLICATION

This application is a Continuation of International Application Serial No. PCT/DE93/00740, filed Aug. 17, 1993.

BACKGROUND OF THE INVENTION

Field of the Invention:

The invention relates to an apparatus for detecting a geometric relation having a device with a magnetic field source and a configuration formed of a multiplicity of Hall elements, for detecting a geometric position of an object.

In principle, such apparatuses are known, inter alia, from Published European Application No. 0 115 391 A3, corresponding to U.S. Pat. No. 4,737,710, in which a sensor configuration for position detection using four Hall elements that are disposed at a given distance from one another is described. Preferably, in that apparatus, in each case analog output variables of two Hall elements with opposite signs are superimposed on one another so that only a relative change in a magnetic field which acts on the sensor configuration is evaluated. A symmetrical rotating device, which is gearwheel-shaped in the broadest sense, is used as a sensor for a variable magnetic field. A distance between two influences on the magnetic field which are of the same type and are brought about by that device is large in comparison with a distance between the individual Hall elements. The four Hall elements deliver the second derivative of the change in the magnetic field over time. Four Hall elements are used because, as a result, a higher signal deviation is achieved with the same change in magnetic field. The sensor configuration described in Published European Application No. 0 115 391 A3, corresponding to U.S. Pat. No. 4,737,710, serves for relative position detection of a rotating part with the aid of the determination of the difference in magnetic field between two Hall elements in each case.

In many applications for apparatuses for position detection, in particular in the construction of vehicles, it is necessary to precisely identify the actual instantaneous relative positions at all times. That is not possible when using an apparatus according to Published European Application No. 0 115 391 A3, corresponding to U.S. Pat. No. 4,737,710. In the publication "Halbleitersensoren" [Semiconductor Sensors], edited by Prof. Dr. Ing. W. J. Bartz et al., Expert Verlag, in Chapter 6.4 on page 259 et seq., in particular on pages 265 to 267 in Section 6.4.3 entitled "Analoge Positionserfassung" [Analog Position Detection], position detection apparatuses which would fulfill those criteria are described in principle. In that case, the Hall voltage as a function of the distance of a Hall element from a movable permanent magnet is simply used as a distance criterion. However, as can be seen in particular in FIG. 6.20 on page 625, such an apparatus is distinguished by a very low range with a linear relation between the change in distance and the change in the magnetic field. Likewise, it has a strong dependence on the temperature, for example.

The application of such a principle in a throttle valve angle sensor for internal combustion engines is described in German Published, Non-Prosecuted Application DE 38 26 408 A1, corresponding to U.S. Pat. No. 4,893,502. A throttle valve angle sensor for internal combustion engines which is described therein has a permanent magnet that is attached to one end of the throttle valve shaft and produces a constant magnetic flux having a direction which is turned as a function of the rotation of the throttle valve shaft. In that case, a magnetically sensitive element, such as a Hall element, for example, by means of which the change in magnetic flux density is measured as a consequence of the rotation of the permanent magnet, is disposed essentially parallel to the main direction of the outwardly directed magnetic flux of the permanent magnet and at a distance from the permanent magnet. The measured changed in the magnetic flux density is converted in that case into a corresponding change in an electrical signal by means of an amplifying electric circuit.

The output variable of the magnetically sensitive element usually has an equivalent variable which is independent of the magnetic field, a so-called offset, superimposed on it in that case. In the case of an output current it is a superimposed direct current and in the case of an output voltage it is a superimposed direct voltage. That offset and the amplification and the linearity of Hall elements fluctuate very strongly from element to element and with temperature. Furthermore, the linearity range of magnetically sensitive elements, such as Hall elements, for example, is very limited so that with such a previously described, known apparatus, complex adjustment is required and, furthermore, because of the aforesaid problems the resolution, i.e. the dynamic range and the precision of the measurement result of such an apparatus, is not very large. In applications in which the intention is to ensure precise position detection even if brief voltage failures may occur, precision potentiometers are therefore usually used. However, problems occur with the latter due to aging and due to poor contacts resulting from contamination or corrosion.

SUMMARY OF THE INVENTION

It is accordingly an object of the invention to provide a position-detecting apparatus using hall elements, which overcomes the hereinafore-mentioned disadvantages of the heretofore-known apparatuses of this general type or which ensures that such disadvantages only occur to a very small degree.

With the foregoing and other objects in view there is provided, in accordance with the invention, an apparatus for detecting a geometric relation, comprising a configuration of a multiplicity of Hall elements being disposed at a given distance from one another along a given line; a device having a magnetic field source and providing the configuration of Hall elements with a magnetic induction being dependent on a relative geometric position between the configuration of Hall elements and an object having a geometric position to be detected; the configuration of Hall elements converting the geometry-dependent magnetic induction into an analog electric signal; and an interpolation circuit for interpolating the analog output signals of at least two of the Hall elements in each case to form a common analog output signal.

In accordance with another feature of the invention, the given distance is identical between each two adjacent Hall elements. In accordance with a further feature of the invention, the given line along which the Hall elements are disposed is a straight line. In accordance with an added feature of the invention, the given line along which the Hall elements are disposed is a curved line.

In accordance with an additional feature of the invention, the configuration of Hall elements and the interpolation circuit are monolithically integrated together.

In accordance with yet another feature of the invention, the interpolation circuit for each of the Hall elements includes a difference amplifier stage with a voltage signal input and a current signal output, and the current signal outputs are combined to form a common current node.

In accordance with yet a further feature of the invention, each of the difference amplifier stages includes two transistors having emitters, base terminals for receiving the input voltage and collector terminals for supplying the output current, and a current source connected between the emitters and a reference potential. In accordance with yet an added feature of the invention, there is provided a resistor connected between the emitters. In accordance with yet an additional feature of the invention, one of the transistors has a further collector terminal through which a collector component current is fed to the collector terminal of the other of the transistors. In accordance with a concomitant feature of the invention, there is provided an isolating amplifier having an adjustable amplification and being connected upstream of an input of one of the difference amplifier stages.

An apparatus for position detection according to the invention contains a multiplicity of Hall elements which are disposed either along a straight line or along a given line at given distances from one another and an interpolation circuit which interpolates at least the analog output variable of two Hall elements with the object of obtaining a desired electric output signal as a function of the magnetic input variable. With such an apparatus, the geometric distribution of a constant magnetic field along the series of Hall elements can be detected. In this case, the linear ranges of the individual Hall elements are superimposed by interpolation of the output variables of the individual Hall elements and as a function of the geometric configuration of the individual Hall elements with respect to one another, in such a way that the overall apparatus has a very large range with a linear relation between the change in geometry of the magnetic field to be detected and the output signal of the overall apparatus. If it is ensured by means of the overall apparatus that the magnetic induction detected by the Hall element configuration can be assigned unambiguously to the relative geometric disposition between the Hall element configuration and an object having a geometric position which is to be detected, a geometric position to be detected can be assigned unambiguously to each level of the output signal of the interpolation circuit. In this case, by varying the distances between individual Hall elements, by varying the working point of the individual Hall elements and by corresponding dimensioning of the interpolation circuit, a linear relation between the geometric variable to be detected and the analog value of the output signal of the interpolation circuit can be achieved.

A linearization of the relation between the geometric relation to be detected and the electric output signal of the apparatus within the preferably monolithically integrated circuit facilitates the construction and the adjustment of an overall apparatus. All that still has to be ensured is that there is a linear relation between the geometric relation to be detected, for example a position of a throttle valve, and the geometric distribution of a constant magnetic field over the Hall element configuration.

In an apparatus according to the invention, this involves the detection of the geometric configuration of a constant magnetic field. In contrast, in known apparatuses a change in the strength of the magnetic field which is brought about by the change in geometry is detected independently of its geometric distribution.

Other features which are considered as characteristic for the invention are set forth in the appended claims.

Although the invention is illustrated and described herein as embodied in a position-detecting apparatus using hall elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2c is a diagram showing a location-dependent Hall voltage characteristic for the individual Hall elements according to FIG. 2a;

FIG. 3a is a schematic diagram of a possible embodiment of an interpolation circuit for an apparatus according to the invention in which each Hall element is assigned a difference amplifier;

FIG. 3b is a diagram showing a signal characteristic of a non-inverting output of an interpolation circuit according to FIG. 3a and corresponding signal characteristics for the individual difference amplifier configurations of that interpolation circuit;

DESCRIPTION OF THE PREFERRED EMBODIMENTS

Figure 1:
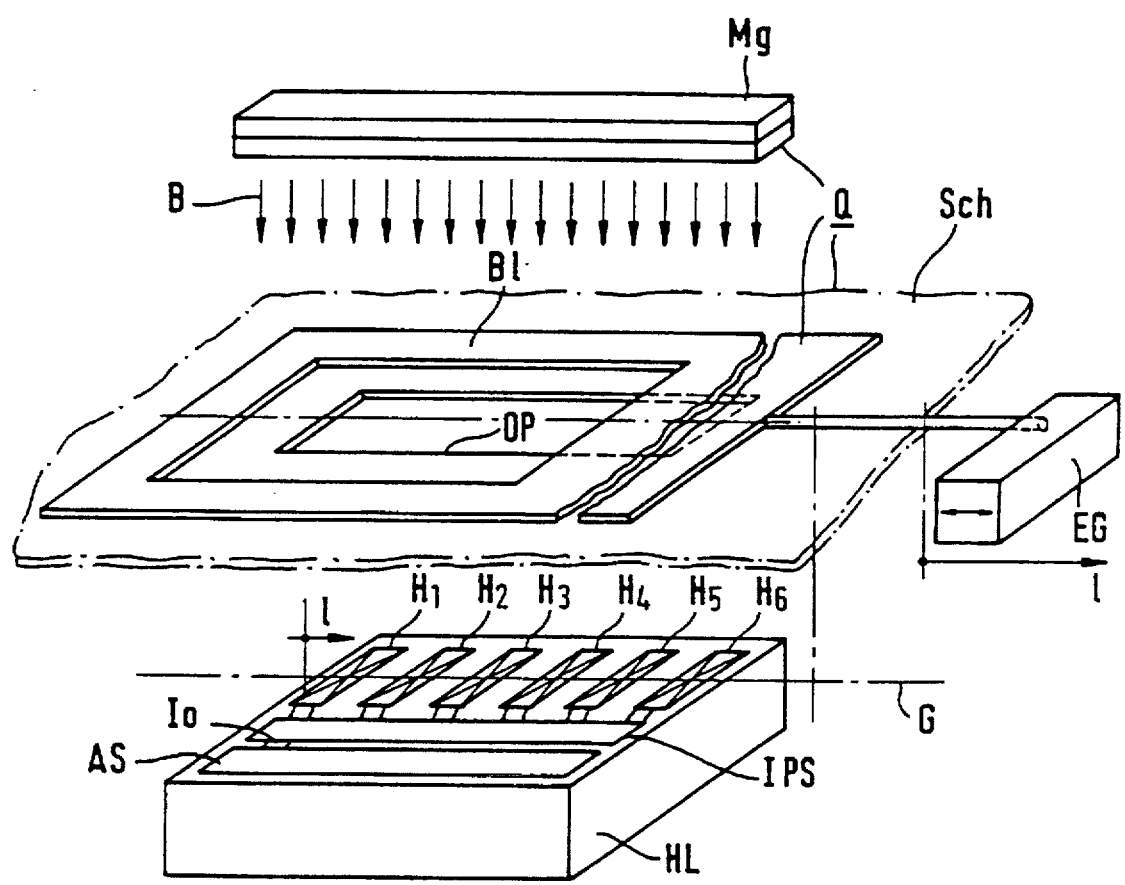
FIG. 1 is a fragmentary, diagrammatic, perspective view of an embodiment of an apparatus according to the invention with a device having a magnetic field source and a configuration being formed of a multiplicity of Hall elements that are disposed along a line which is straight in the example and with an interpolation circuit.

Referring now to the figures of the drawing in detail and first, particularly, to FIG. 1 thereof, there is seen a diagrammatic view of an embodiment of an apparatus for detecting a geometric relation with a device Q having a magnetic field source Mg. The magnetic field source Mg is preferably constructed as a permanent magnet and, in an exemplary embodiment according to FIG. 1, it provides a constant area-distributed magnetic field with a magnetic induction B. The apparatus according to FIG. 1 contains six Hall elements $H_1$, $H_2$, $H_3$, $H_4$, $H_5$ and $H_6$ which are disposed along a line G in such a way that the magnetic field lines of the magnetic field source Mg are directed essentially parallel to one another with respect to the Hall element configuration. The line G is straight in the exemplary embodiment. The device Q having the magnetic field source Mg has a shield device Sch which extends at least between the magnetic field source Mg and the Hall element configuration $H_1 \ldots H_6$ and has a given opening OP in the region between the magnetic field source Mg and the Hall element configuration. This opening OP can be covered entirely or partially by a shutter B1. In the illustrated exemplary embodiment having the Hall elements $H_1 \ldots H_6$ disposed along the straight line G, the opening OP is elongated and extends parallel to the straight line G. An object EG has a position relative to the Hall element configuration $H_1 \ldots H_6$ which is to be detected. The shutter B1 can be moved as a function of the movement of the object EG along a line which extends parallel to the straight line G. In this case, the width of the opening of the shutter in the longitudinal direction is dependent on the instantaneous position of the shutter and thus of the object EG along a distance 1. In this apparatus, the device Q with the magnetic field source Mg provides a magnetic field which is essentially uniform per surface unit or length unit, as a function of the instantaneous position of the object EG over a specific region of the multiplicity of Hall elements. The Hall elements, which are acted on by this magnetic field or the magnetic induction which is dependent thereon, each supply a Hall voltage at their output which is dependent on the magnetic induction. The outputs of the individual Hall elements $H_1$, $H_2 \ldots H_6$ are connected to an interpolation circuit IPS. This interpolation circuit IPS provides a signal Io at an output as a function of the Hall voltages of the individual Hall elements. The output of the interpolation circuit IPS is connected to an input of an evaluation circuit AS. The multiplicity of Hall elements, the interpolation circuit and the evaluation circuit are preferably integrated in a single semiconductor element HL in the exemplary embodiment according to FIG. 1. The evaluation circuit AS can be of varying structure depending on the application. In particular, it can contain an analog-to-digital converter.

Figure 4:
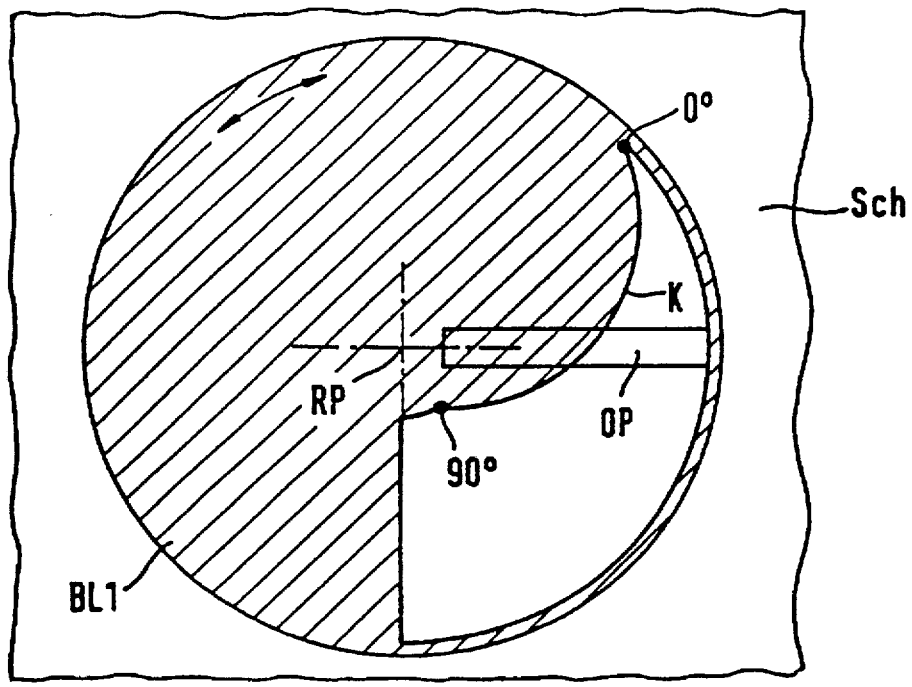
FIG. 4 is a fragmentary plan view of a further possible embodiment of a shutter in conjunction with a shield for use in a device with a magnetic field source in FIG. 1 which is suitable for bringing about a local change in a magnetic field in the longitudinal direction as a function of an angle of rotation.

FIG. 4 shows an alternative embodiment of a device with a magnetic field source for an apparatus according to FIG. 1. In this case the shield device Sch has a slot-shaped, essentially elongated opening OP which is aligned between the magnetic field source seen in FIG. 1 and the Hall element configuration seen in FIG. 1, parallel to the straight alignment line G of the Hall elements. A shutter BL1 has a specially constructed curved edge K and is rotatably mounted at a rotation point RP which is located on the center line of the opening OP in the longitudinal direction. The edge K is shaped in such a way that a change in the angle of rotation of the shutter BL1 leads to a proportional change in length of the opening which is exposed by the shutter BL1 and the opening OP of the shield device. The embodiment shown is suitable for converting an angular rotation of 90° into a proportional change in length.

Figure 2A:
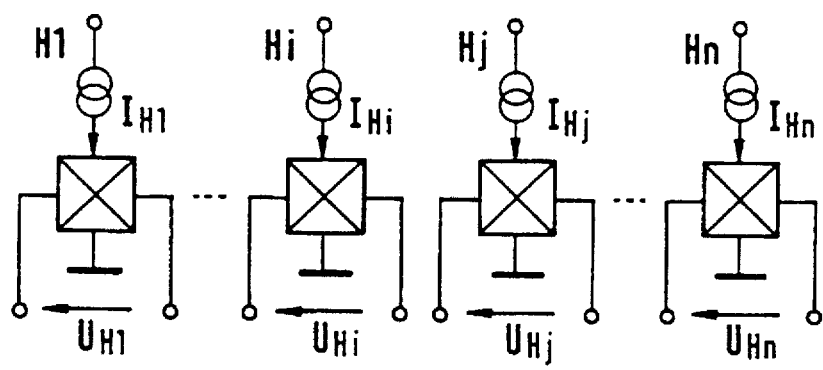
FIG. 2a is a schematic diagram of a multiplicity of Hall elements such as can be used in an apparatus according to FIG. 1.

FIG. 2a shows a diagrammatic view of a series of Hall elements disposed along a straight line. In this case, a first element $H_1$, two adjacent elements Hi and $H_j$ and a last element Hn are illustrated. The total number of Hall elements will be n in this case, with n being a positive integer which is greater than 1. In FIG. 2a, a working point current source $I_{H1}$, $I_{Hi} \ldots I_{Hn}$ is illustrated for each Hall element. In addition, output voltages $U_{H1}$, $U_{Hi}$, $U_{Hj}$ and $U_{Hn}$ of the individual Hall elements are shown.

Figure 2B:
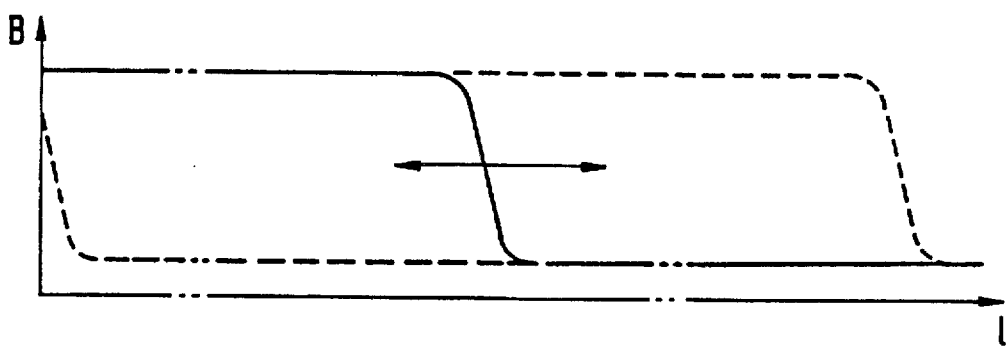
FIG. 2b is a diagram showing a distribution of the magnetic field or the magnetic induction as a function of location, as it acts on the multiplicity of Hall elements in an apparatus according to FIG. 1.

FIG. 2b shows the potential characteristic of the magnetic induction over the Hall element configuration as a function of the distance 1. In this case, the limit values are illustrated by broken lines and an exemplary value is shown by an unbroken line. As is clear, in an apparatus according to the invention a constant magnetic induction preferably acts in a length-dependent fashion on the Hall element configuration.

Figure 2C:
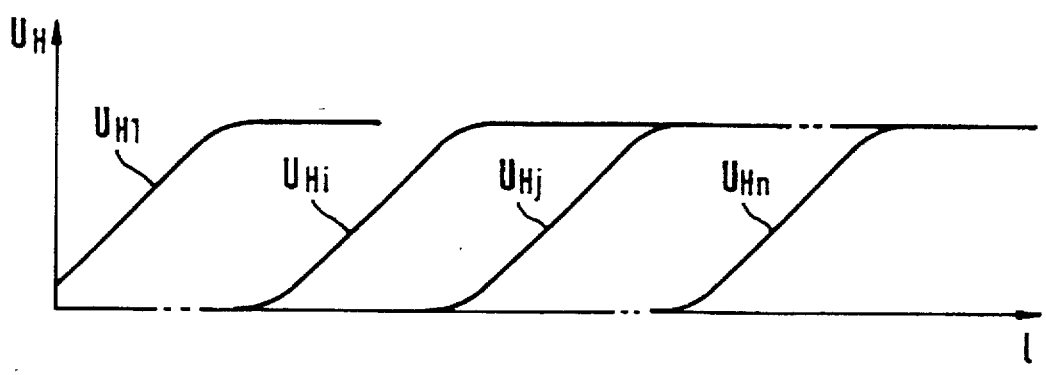

FIG. 2c shows the Hall voltages $U_{H1}$, $U_{Hi}$, $U_{Hj}$ and $U_{Hn}$ provided by the respective Hall elements H1, Hi, $H_j$ and Hn, as a function of the length 1 in a diagrammatic view.

In the simplest case, an evaluation can take place by the Hall elements being connected in series so that the individual output voltages are summed. Then a quasi-linear relation is obtained since the individual Hall elements supply a linear output voltage in subareas.

FIG. 3a shows a possible embodiment of the interpolation circuit IPS for use in an apparatus according to the invention. The interpolation circuit shown provides a difference amplifier stage with a voltage signal input and a current signal output, for each Hall element $H_1, \ldots Hi, \ldots Hn$. The current signal outputs of individual difference amplifier stages DVi, DVj are combined at a common current node. In this case, the outputs of the difference amplifier stages DVi, DVj, ... which conduct a positive output signal $Io_i+$, $Io_j+$, ... are combined in a common current node Io+ and the signal outputs of the difference amplifier stages DVi, DVj, ... which conduct a negative current output signal $Io_i-$, $Io_j-$, ... form a common current output ΣIo−. Working points of the individual difference amplifier stages DVi, Dvj, ... are each set with a current $Io_i$, $Io_j$, ... through a current source. Each difference amplifier stage has a preferably symmetrical signal input which is connected to the signal output of an individual Hall element $H_1, \ldots Hi, H_j \ldots Hn$ and is thus acted on by the corresponding Hall voltage $U_{Hi}$, $U_{Hj}$, .... In the apparatus shown in FIG. 3a, the total current of all of the current sources $Io_i$, $Io_j$, ... which set the respective working point is constant and forms the current Io. The current Io is composed in this case of the positive signal currents and the negative signal currents, so that the following applies:

$$\Sigma Io = \Sigma Io - + \Sigma Io +.$$

Figure 3C:
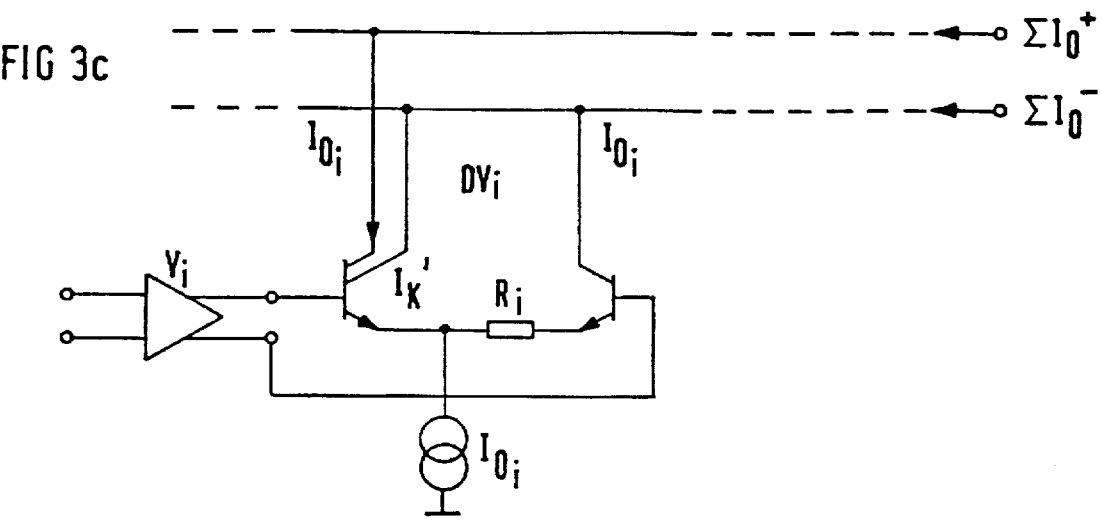
FIG. 3c is a schematic diagram of a further possible embodiment of an interpolation circuit.

FIG. 3c shows a further embodiment of the interpolation circuit shown in FIG. 3a. In comparison with the circuit according to FIG. 3a, the circuit according to FIG. 3c has the following optional modifications. In addition, a negative feedback resistor $R_i$ is connected between the emitters of the difference amplifier stage. Furthermore, collector component currents $I_{K'}$ from one of the transistors can be connected for negative feedback to the respective other current node ΣIo+ or ΣIo−. Finally, an individual isolating amplifier $V_i$ with selectable amplification can be connected upstream of the inputs of each evaluation stage.

FIG. 3b shows the characteristic of the individual positive current signals $Io_1+$, $Io_i+$, $Io_j+$, ... Ion+ in an apparatus according to FIG. 3a and the characteristic of the current signal Io+ of the overall apparatus if an even number of Hall elements is used. The illustration according to FIG. 3b is idealized, but largely shows the relation between a location-dependent magnetic field and an output signal of an interpolation circuit IPS for an apparatus according to the invention, such as is illustrated, for example, in FIG. 1. The linearity of the relation between the location and the output signal can be optimized in this case by different measures. On one hand, the Hall sensors can be disposed at different distances from one another or may be completely differently constructed. Furthermore, the working point currents $Io_1, \ldots Io_i, Io_j, \ldots Ion$ of the individual difference amplifier stage $DVi, \ldots$ of an interpolation circuit can be of different sizes. Additionally, the difference amplifiers can have different geometry. A negative feedback in the difference amplifiers of an interpolation circuit IPS also leads to a change in the location-dependent output signal of the overall apparatus. A further possible way of constructing an interpolation circuit is by using cross-connected difference amplifiers. In each case the base terminals of two transistors with emitter surfaces of different sizes are connected together in a bipolar construction and form an input gate of the difference amplifier circuit. The emitter terminals of the four transistors which form a difference amplifier stage are furthermore connected together and connected to a supply potential through a constant current source. The collector terminals of the transistors are connected together, and the collector terminals of the transistors which differ both in the emitter surface and in the signal input are connected together.

Figure 5:
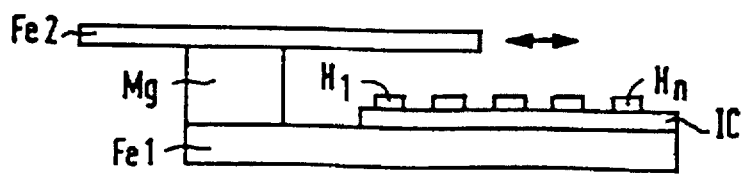
FIG. 5 is an elevational view of a further possible embodiment of an apparatus according to the invention.
Figure 5A:
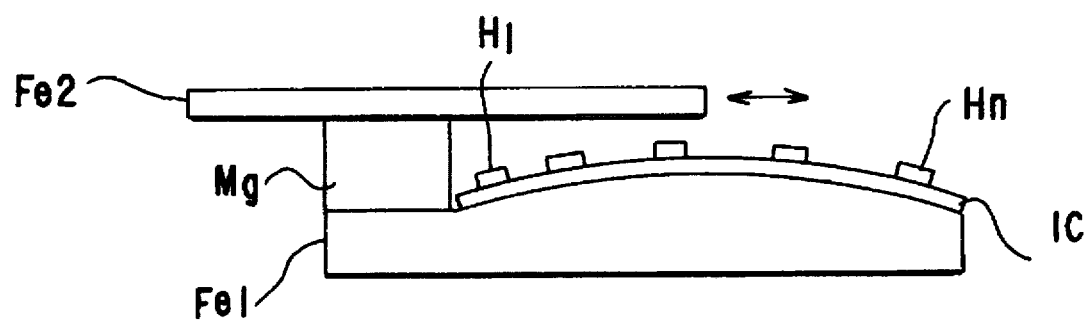
FIG. 5A is a similar view of an alternative embodiment with the Hall elements disposed along a curved line.

FIG. 5 and 5A shows two further embodiments of the apparatus according to the invention. In the diagrammatic illustration, a magnetic field source Mg for producing a parallel magnetic field is in turn provided between two poles, similarly to a horseshoe magnet. A first pole Fe1 is permanently connected to the magnetic field source Mg. A second pole Fe2 is mounted on its longitudinal axis so as to be horizontally movable. In the illustrated example, the first pole Fe1 is mounted below the magnetic field source Mg and the second movable pole Fe2 is mounted above it. A multiplicity of Hall elements $H_1 \ldots Hn$ is mounted between the poles Fe1 and Fe2 on the pole Fe1. The Hall elements $H_1 \ldots Hn$ can be integrated, for example, in an integrated circuit. By moving the pole Fe2, a constant magnetic field will flow through a greater or lesser number of Hall elements $H_1$ to Hn. During evaluation by means of one of the above evaluation circuits, a linear output voltage for moving the pole Fe2 can thus be produced.

An advantage of an apparatus according to the invention for position detection using Hall elements is that the temperature dependence and supply voltage dependence of the offset signal, which occur in known apparatuses, the linearity and the amplification are essentially reduced by a factor which corresponds to the reciprocal of the number of Hall elements being used, and that very much larger geometries can be detected.

I claim:

1. An apparatus for detecting a geometric relation, comprising:

a configuration of a multiplicity of Hall elements disposed at predetermined distances from one another along a given line, each of said Hall elements connected to a respective first current source;

a device having a magnetic field source and providing said configuration of Hall elements with a magnetic induction dependent on a relative geometric position between said configuration of Hall elements and an object having a geometric position to be detected;

each of said Hall elements converting the geometry-dependent magnetic induction into a separate analog electric output signal; and an interpolation circuit for interpolating the analog output signals of at least two of said Hall elements, said interpolation circuit comprising, for each of said Hall elements, a differential amplifier stage with an output, and a differential input connected to the respective Hall element and receiving the analog output signal from the respective Hall element as an input voltage, wherein each said differential amplifier stage generates a current signal output and wherein the current signal outputs of the differential amplifier stages are combined to form a common current node, each said differential amplifier stage including two transistors each having an emitter, a base and a collector, a resistor connected between said emitters of said two transistors, said emitters being connected to reference potential through a second current source, said bases being connected to receive the input voltage, and said collectors issuing the current signal output, and wherein one of said transistors has a further collector terminal from which a collector current component of the one transistor is fed to the collector of the other of said two transistors.

2. The apparatus according to claim 1, wherein said predetermined distances are identical between each two adjacent Hall elements.

3. The apparatus according to claim 1, wherein said given line along which said Hall elements are disposed is a straight line.

4. The apparatus according to claim 1, wherein said given line along which said Hall elements are disposed is a curved line.

5. The apparatus according to claim 1, wherein said configuration of Hall elements and said interpolation circuit are monolithically integrated together.

6. The apparatus according to claim 1, including an isolating amplifier having an adjustable amplification and being connected upstream of an input of one of said differential amplifier stages.

* * * * *